(12) United States Patent
McWhinnie et al.

(10) Patent No.: US 6,709,061 B2
(45) Date of Patent: Mar. 23, 2004

(54) SEAT FRAME STRUCTURE AND METHOD FOR FORMING

(75) Inventors: John McWhinnie, Brampton (CA); Bill Frenke, Oakville (CA)

(73) Assignee: Triton Tubular Components Corp., Toronto (CA)

( * ) Notice: Subject to any disclaimer, the term of this patent is extended or adjusted under 35 U.S.C. 154(b) by 0 days.

(21) Appl. No.: 10/133,000

(22) Filed: Apr. 26, 2002

(65) Prior Publication Data

US 2003/0201663 A1 Oct. 30, 2003

(51) Int. Cl.⁷ .................................................. A47C 7/02
(52) U.S. Cl. ................................ 297/452.18; 297/452.2
(58) Field of Search ......................... 297/452.18, 452.2

(56) References Cited

U.S. PATENT DOCUMENTS

| | | | |
|---|---|---|---|
| 3,286,539 A | 11/1966 | Loper et al. | |
| 3,327,385 A | 6/1967 | Shaver | |
| 4,519,650 A | 5/1985 | Terada et al. | |
| 4,656,721 A | 4/1987 | Werner | |
| 4,698,968 A | 10/1987 | Mestieri | |
| 5,092,634 A | 3/1992 | Miller | |
| 5,367,759 A | 11/1994 | Loew et al. | |
| 5,498,096 A | * 3/1996 | Johnson | 29/523 |
| 5,499,863 A | * 3/1996 | Nakane et al. | 403/267 |
| 5,749,135 A | 5/1998 | Crane et al. | |
| 5,769,499 A | 6/1998 | Dudash et al. | |
| 5,988,756 A | * 11/1999 | Aufrere et al. | 455/115 |
| 6,019,273 A | * 2/2000 | Garnweidner | 228/144 |
| 6,035,516 A | 3/2000 | Petersen | |
| 6,059,369 A | * 5/2000 | Bateson et al. | 297/452.18 |
| 6,223,436 B1 | * 5/2001 | Dudash et al. | 297/452.2 |
| 6,322,148 B1 | * 11/2001 | Kolena et al. | 297/452.18 |
| 6,338,191 B1 | * 1/2002 | Petersen | 297/452.2 |
| 6,352,311 B1 | * 3/2002 | Hayotte | 297/452.2 |

FOREIGN PATENT DOCUMENTS

| | | |
|---|---|---|
| CA | 2235636 | 4/1998 |
| CA | 2328857 | 4/1998 |

* cited by examiner

Primary Examiner—Peter M. Cuomo
Assistant Examiner—Stephen D'Adamo
(74) Attorney, Agent, or Firm—Harness, Dickey & Pierce, P.L.C.

(57) ABSTRACT

A tubular seat frame member is provided which has a run of ductile metal tubing with at least two headrest guide tube mounting passages formed therein and extending transversely there through. Each of the mounting passages has an upstanding wall encircling the mounting passage and extending outwardly from one side of the tubular seat frame member. Each upstanding wall is formed from an integral with the run of ductile metal tubing. Each of the mounting passages has a first end proximal the run of tubing and a second end distal the run of tubing.

9 Claims, 10 Drawing Sheets

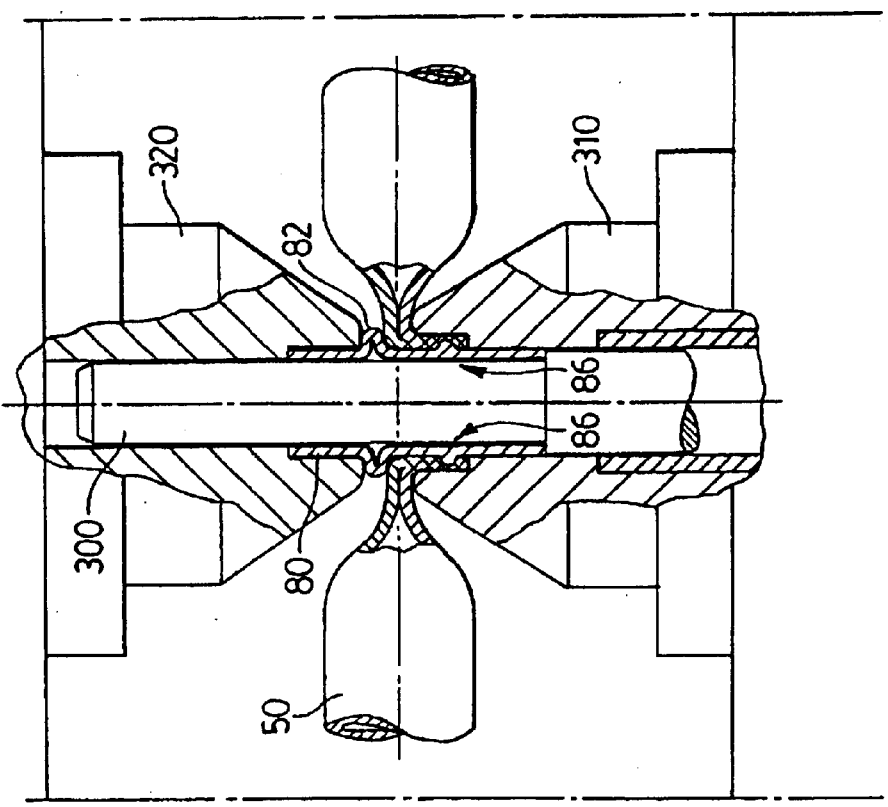
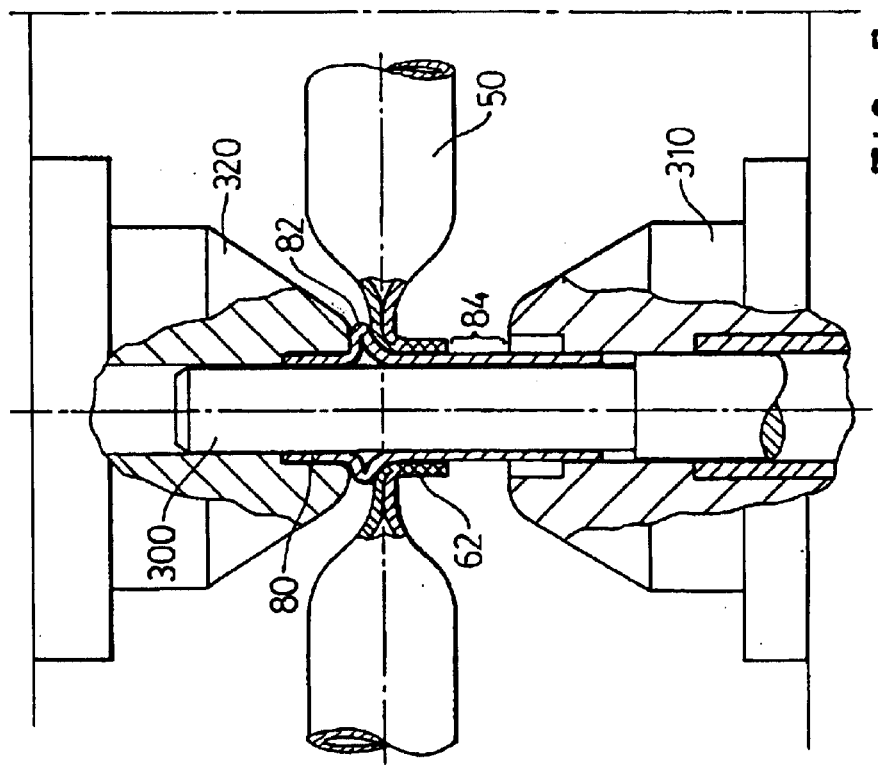

SEAT FRAME STRUCTURE AND METHOD FOR FORMING

BACKGROUND OF THE INVENTION

This invention relates generally to seat frames and more specifically to the joining of a headrest guide tube to a tubular seat frame such as for automotive application.

FIELD OF THE INVENTION

One method of providing support for the seat back of an automotive seat is to provide a frame of metal tubing which runs generally contiguous to the perimeter of the seat. As automotive seats require headrests for passenger safety, provision is required to secure the headrest to the seat frame.

One manner of mounting a headrest is to provide the headrest with two generally parallel downwardly depending mounting posts which are slidable relative to corresponding guide tubes mounted to the seat frame. The headrest guide tubes generally receive an insert which may be a polymeric sleeve to provide smooth motion. A detent means may also be provided which acts between the headrest guide tube and the headrest mounting posts to maintain position of the headrest at a desired height.

Traditionally the headrest guide tubes were secured to the seat frame tube by welding. This proved undesirable principally because of the difficulty in assuring close dimensional tolerances and good alignment in any cost effective mass production process.

More recently, as evidenced by U.S. Pat. No. 5,759,499 to Dudash and U.S. Pat. No. 6,035,516 to Petersen securement of a headrest guide tube to a seat frame tube by forming beads on the headrest guide tube has been introduced. The securement generally involves forming a web by flattening the seat frame tube and punching a hole through the web in the seat frame tube to receive the headrest guide tube. A first radially outwardly extending bead is formed on the tube and the beaded tube is inserted into the hole using the bead to position the headrest guide tube. A second bead is then formed on the headrest guide tube on the opposite side of the flattened seat frame tube to capture the seat frame tube between the two beads.

A significant drawback to the above beading method is the loss in rigidity associated both with flattening of the seat frame tube and the loss of metal removed in punching a hole of significant diameter relative to the amount of material present in the seat frame tube. In an effort to recover some of the lost rigidity Petersen teaches forming upstanding flanges on either side of the flattened area. Nevertheless, the amount of rigidity provided by the flanges is not significant compared to the rigidity of the seat frame tube before punching.

Another drawback to the process of the foregoing patents is the possibility of the headrest guide tube rotating relative to the seat frame tube. This is undesirable as the positional relationship between the headrest guide tube and the seat frame tube should be maintained in order to maintain orientation of the detent means.

It is an object of the present invention to provide a method whereby a headrest guide tube opening may be formed in a seat tube with only minimal removal of metal from the seat frame tube.

SUMMARY OF THE INVENTION

A method of forming a transversely extending passage through a tubular seat frame for receiving a headrest guide tube comprises the steps of:

(i) forming first and second diametrically opposed axially aligned openings through said tubing;

(ii) flowing metal from around said first opening through said tube and through said second opening while expanding said first opening to form at least part of an inner wall of said passage;

(iii) flowing metal from around said second opening outwardly from said tube while expanding said second opening to form an outer wall of said passage extending about said inner wall.

A method of securing a headrest guide tube to a tubular seat frame member of ductile metal comprises the steps of:

(i) forming first and second diametrically opposed axially aligned openings through said tubular member;

(ii) flowing metal from around said first opening through said tubular seat frame member and through said second opening while expanding said first opening to initiate a passage extending through said tubular member;

(iii) flowing metal from around said second opening outwardly from said tubular seat frame member while expanding said second opening to receive said metal from around said first opening and form an upstanding wall about said passage, said passage having an entrance adjacent said tubular seat frame member and an exit distal said tubular seat frame member;

(iv) inserting said guide tube through said passage;

(v) deforming said guide tube to form a first detent on said guide tube for limiting displacement of said guide tube in a first direction into said entrance; and (vi) forming a second detent by deforming at least one of said upstanding wall and said guide tube to, in conjunction with said first detent, fixedly secure said guide tube to said tubular seat frame member.

The forming of the first and second diametrically opposed axially aligned openings may be carried out by punching. A first detent may be a first bead.

The second detent may be a second bead on the guide tube or alternatively, formed by clenching the upstanding wall about the guide tube.

A portion of the upstanding wall may be caused to flow into the guide tube to secure the guide tube against rotational movement relative to the seat frame.

A recess may be formed in the guide tube prior to clenching to receive the portion of the upstanding wall.

The flowing of metal from around the first and second openings may be achieved by placing the tubing in an extruding die-set with a core of the die-set aligned with the first hole and a cavity of the die-set aligned with the second hole. The core may then be urged toward the cavity to cause metal surrounding the first and second holes to flow into the cavity while simultaneously enlarging the first and second holes to form the guide tube passage.

A tubular seat frame member is provided which has a run of ductile metal tubing with at least two headrest guide tube mounting passages extending transversely therethrough. Each of the mounting passages may have an upstanding wall encircling the passage and extending outwardly from one side of the tubular seat frame member. The passage may have a first end proximal the run of tubing and a second end distal the run of tubing.

The upstanding wall may further have nested inner and outer wall members extending respectively from opposite sides of the tubular seat frame member.

The tubular seat frame member may include a respective headrest guide tube extending through each of the passages.

Each of the guide tubes may be secured to the seat frame by first locating means at the first end and second locating means at the second end.

The first and second locating means may be respective beads formed in the guide tube.

The first locating means may be a bead formed in the tube and the second locating means may be a clenching of upstanding wall about the headrest guide tube.

The headrest guide tube and the runs of tubing may have inter-engaging projections and recesses formed therein to restrain the guide tube from rotation relative to the run of tubing.

The run of tubing may have a flattened region in the vicinity of the passage.

DESCRIPTION OF DRAWINGS

Preferred embodiments of the present invention are described below with reference to the accompanying illustrations in which:

FIG. 7 is a partially cut-away schematic view of a clenching die-set in an open configuration;

FIG. 8 is a view corresponding to FIG. 7 of the clenching die-set in a closed configuration;

DESCRIPTION OF PREFERRED EMBODIMENTS

Figure 1:
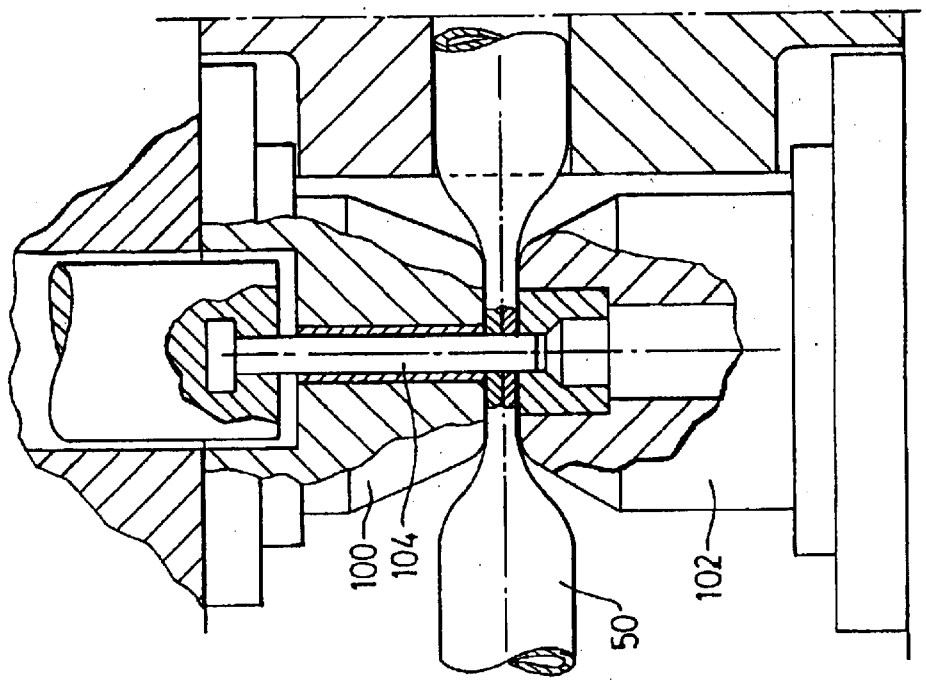
FIG. 1 is a partially cut-away schematic representation of a punch for forming a hole in a seat frame tube in an open configuration.

FIG. 1 illustrates a punch set having an upper member 100, a lower member 102 and a punch 104 in an open configuration. FIG. 1 further illustrates a "length" or "run" of ductile metal tubing 50 placed between the upper member 100 and lower member 102.

Figure 2:
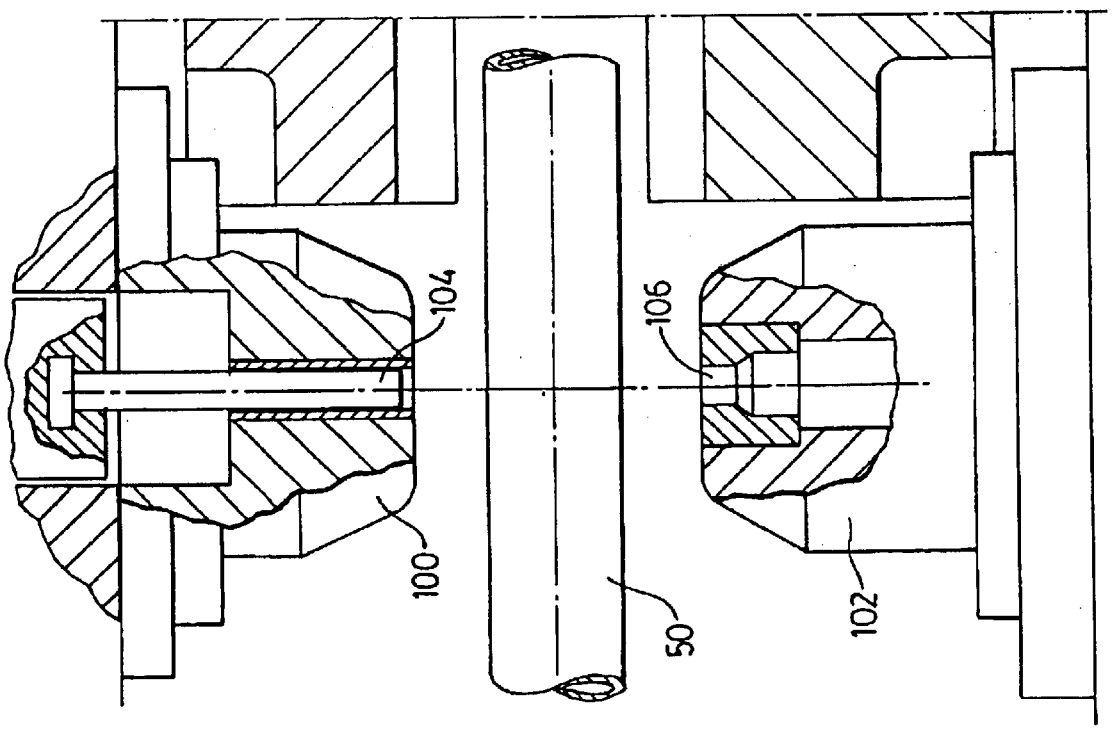
FIG. 2 is a view corresponding to FIG. 1 but illustrating the punch in a closed configuration.

FIG. 2 illustrates the forming of first and second diametrically opposed axially aligned openings 52 and 54 respectively in the tubing 50. This is accomplished by bringing the upper member 100 and lower member 102 toward the tubing 50 and passing the punch 104 through the tubing 50 and into a mating receptacle 106 in the lower member 102. The first opening 52 and second opening 103 are labeled in FIG. 3.

The shape of the tubing 50 in the region of the first and second holes, 52 and 54 respectively, will depend on the configuration of the upper member 100, the lower member 102 and how closely these members are brought together. The arrangement illustrated in FIGS. 1 and 2 provides a flattened region 58 about the openings 52 and 54. Other arrangements may provide walls about the flattened area 58 which may provide additional rigidity.

Figure 4:
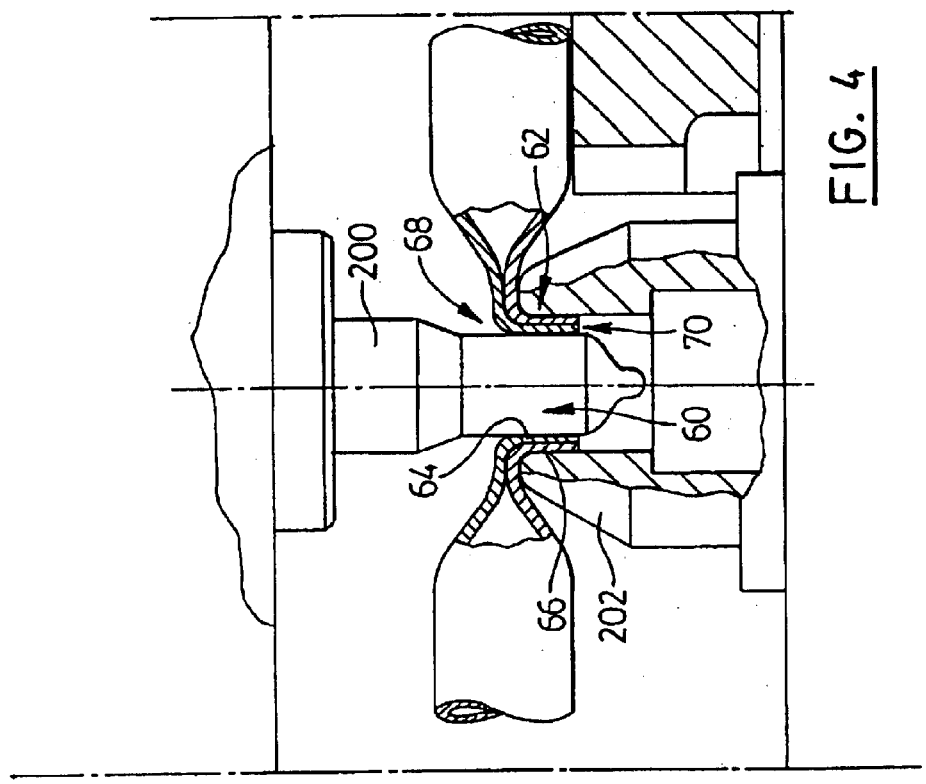
FIG. 4 is a view corresponding to FIG. 3 but illustrating the die-set in a closed configuration.
Figure 3:
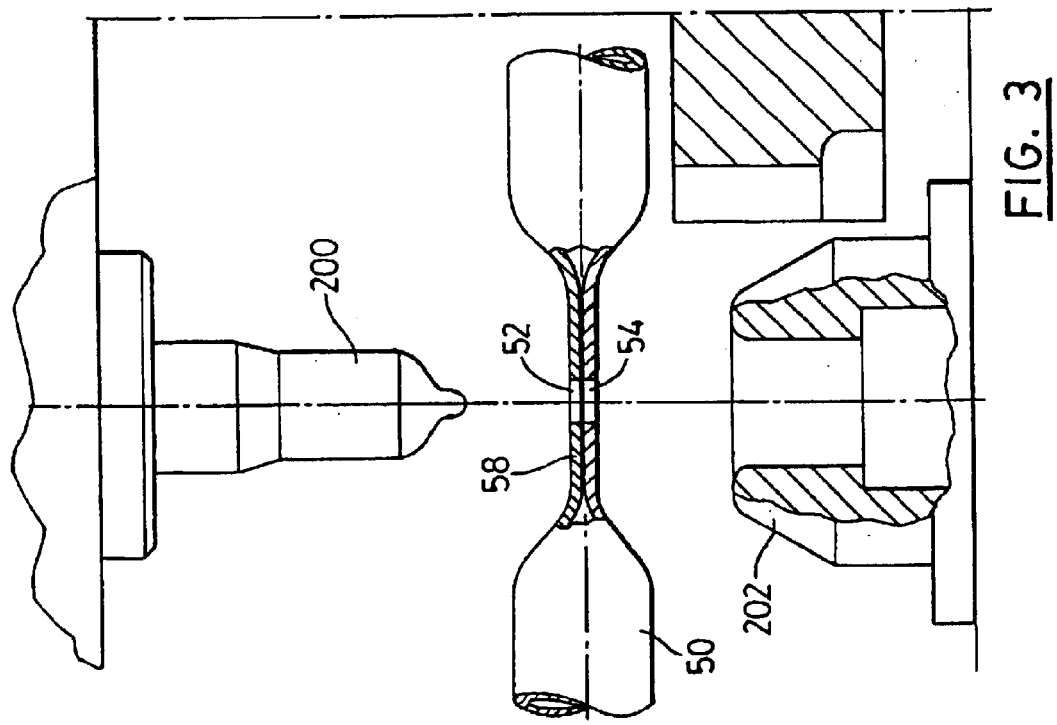
FIG. 3 is a partially cut-away schematic view of an extruding die-set in an open configuration and illustrating a punched seat frame tube prior to extrusion.

After the "punching" operation the tubing 50 is transferred to an extruding die-set as schematically illustrated in FIGS. 3 and 4. The extruding die-set has a core 200 and a cavity 202 which is aligned with the core. The punched tubing 50 is placed between the core 200 and the cavity 202 with the first and second openings, 52 and 54 respectively, aligned therewith. The extruding die-set is moved from an open configuration as illustrated in FIG. 3 to a closed configuration as illustrated in FIG. 4 by passing the core 200 through the openings 52 and 54 and into the cavity 202. This has the effect of flowing metal from about the first opening 52 through the second opening 54 while also enlarging the first opening 52 and the second opening 54.

The extrusion process also forms a passage 60 extending through the tubing with an upstanding wall 62 extending thereabout. The upstanding wall 62 has an inner wall 64 defined at least in part by metal surrounding the first opening 52 and an outer wall 66 formed from metal surround the second opening 54. The passage 60 has two ends which for the sake of convenience are herein referred to as an entrance 68 adjacent the tubing 50 and an exit 70 distal the tubing 50.

The extrusion process forms the passage 60 without removing a significant amount of metal in contrast with earlier processes. Instead, the passage 60 is formed by causing metal that would otherwise be removed, to flow into the wall 62 which defines the passage 60. Accordingly, rather than being removed, the metal surrounding the first opening 52 and second opening 54 is relocated and therefore available to provide torsional rigidity to the resultant structure.

Figure 5:
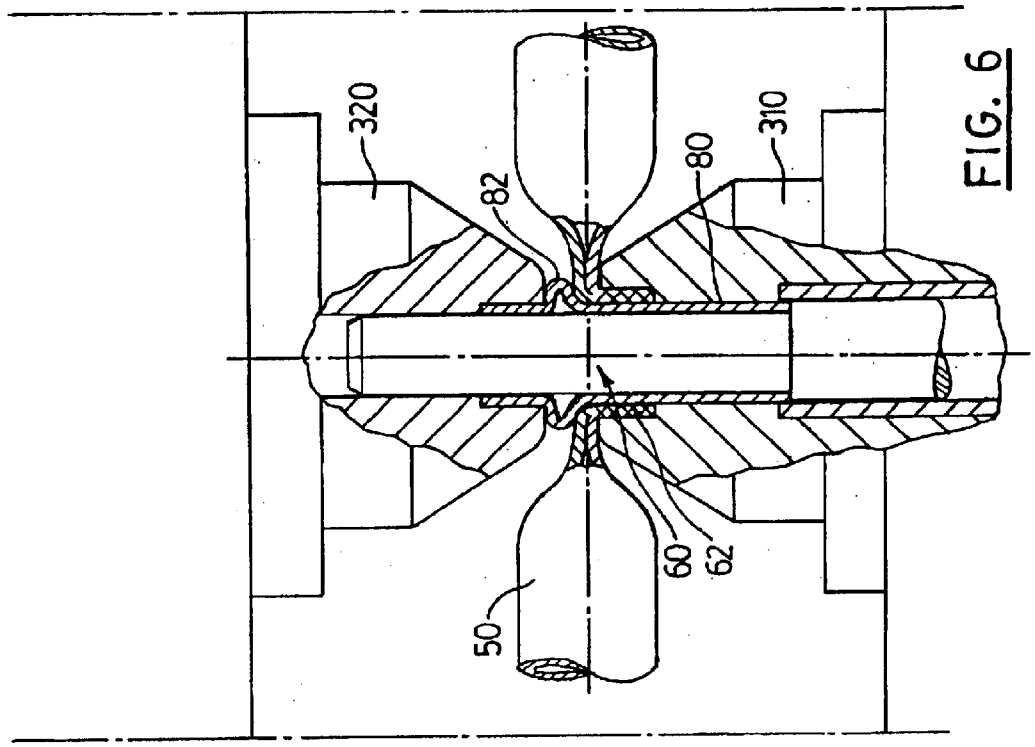
FIG. 5 is a partially cut-away schematic view of beading die in an open configuration illustrating a headrest guide tube inserted through an extruded opening in a seat frame tube.
Figure 6:
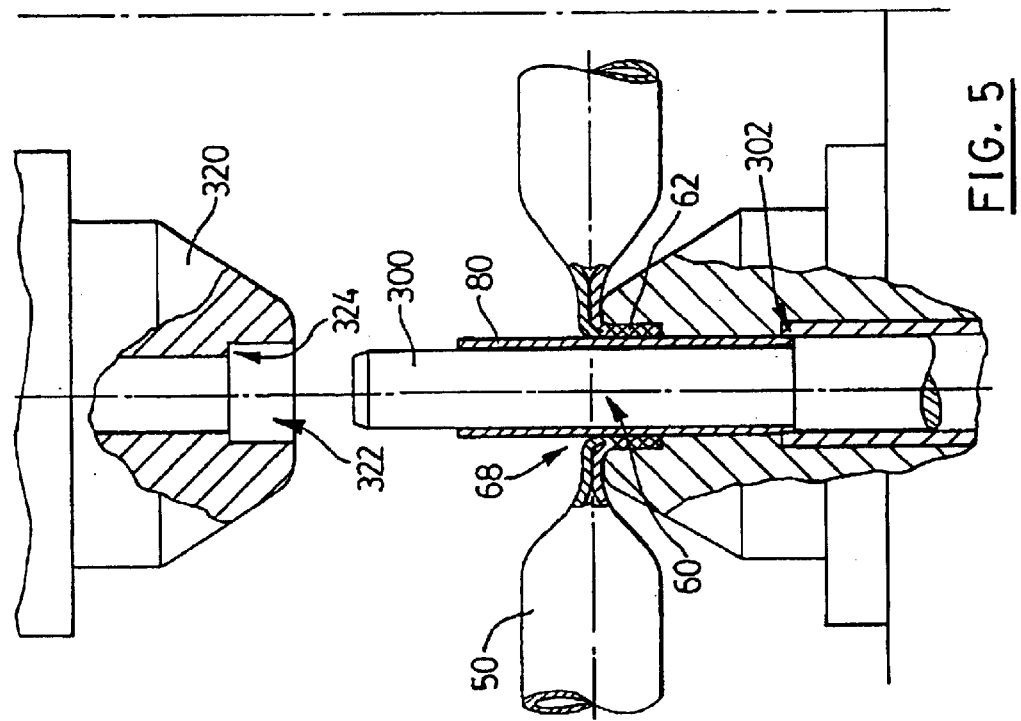
FIG. 6 is a view corresponding to FIG. 5 but showing the die in a closed configuration and the formation of a first bead.
Figure 9:
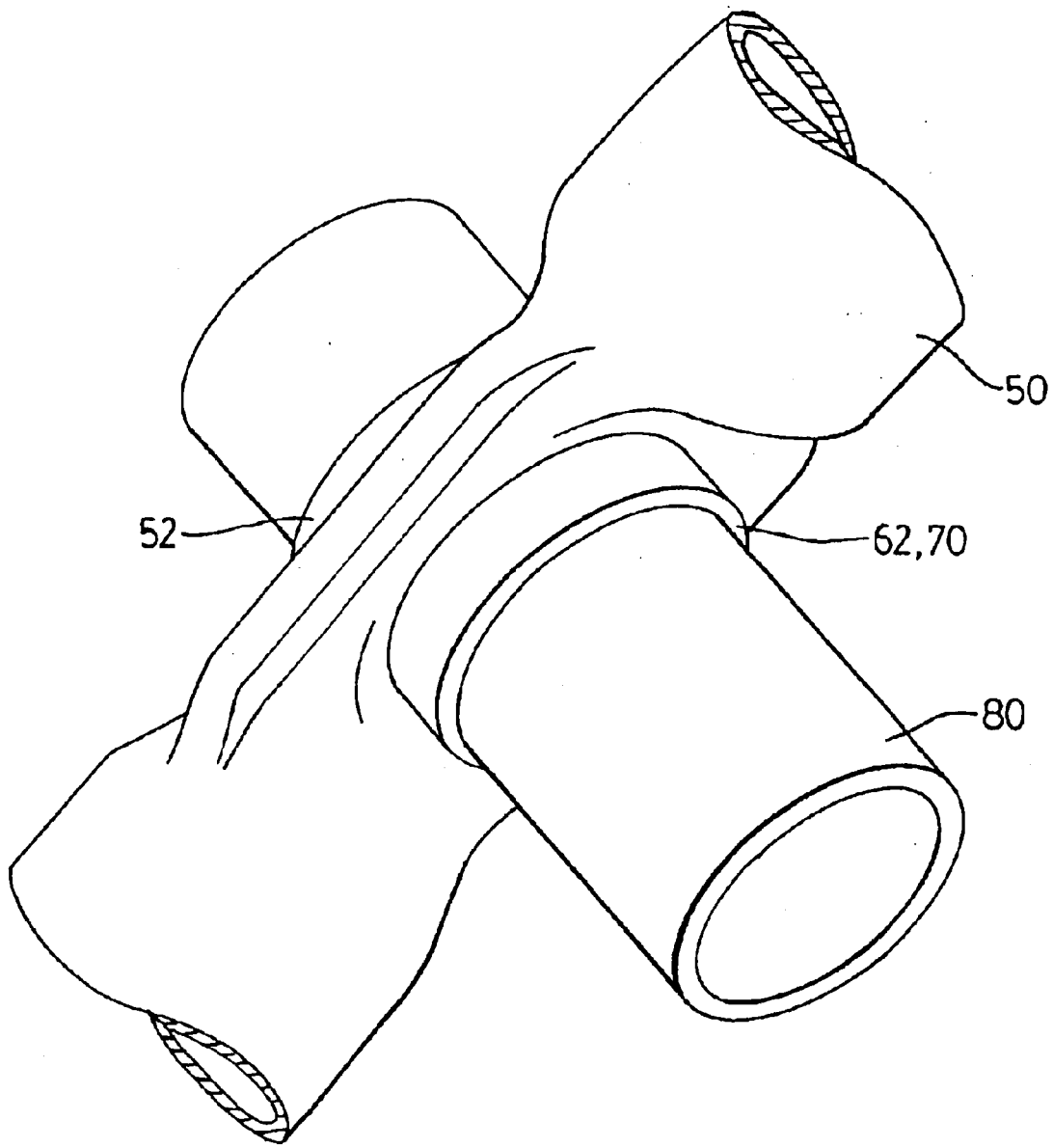
FIG. 9 is a perspective view of a headrest guide tube secured to a tubular seat frame member by a combination of clenching and beading.
Figure 10:
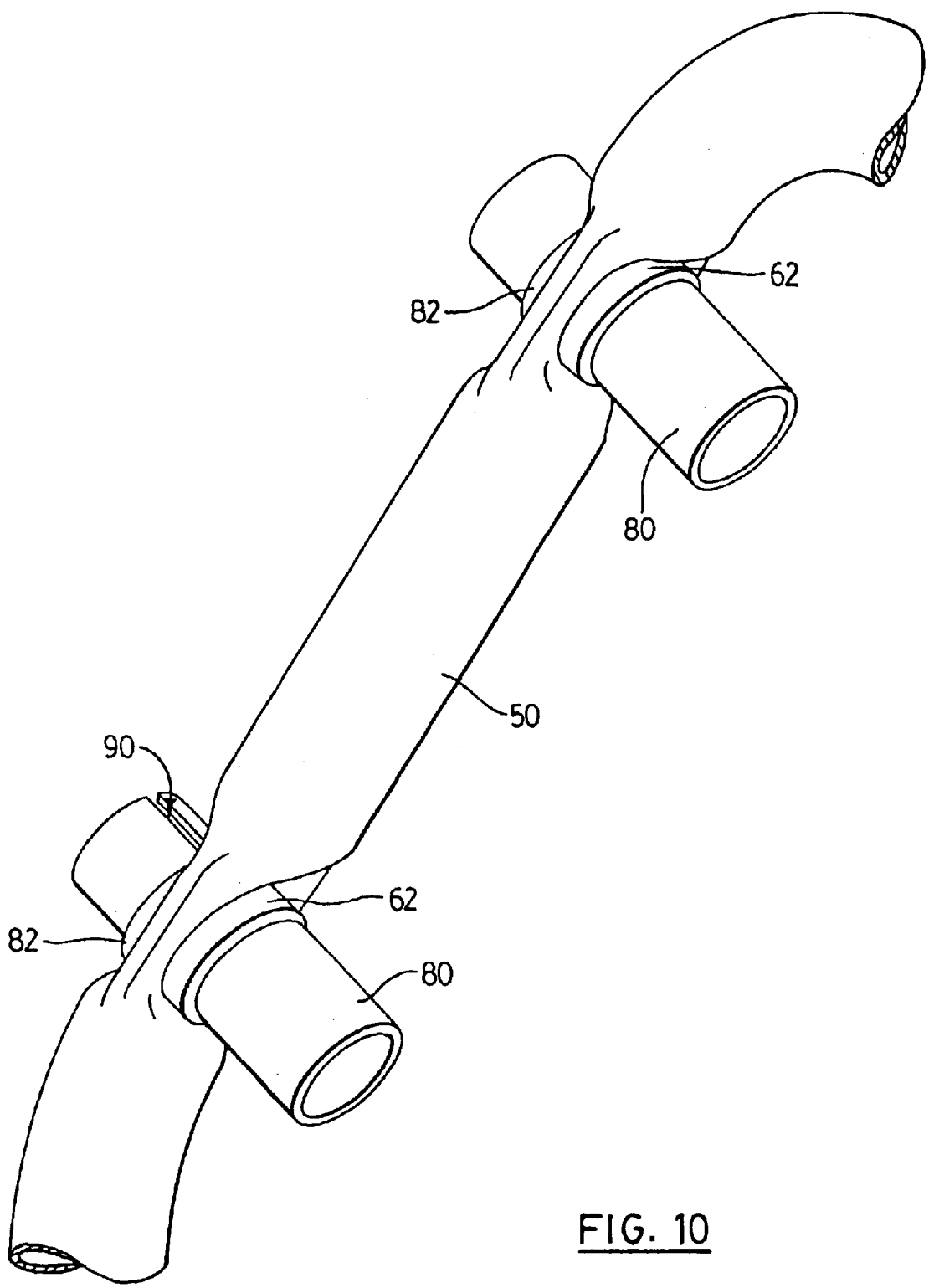
FIG. 10 is a perspective view corresponding to FIG. 9 but illustrating two headrest guide tubes in a longer run of seat frame tubing.
Figure 11:
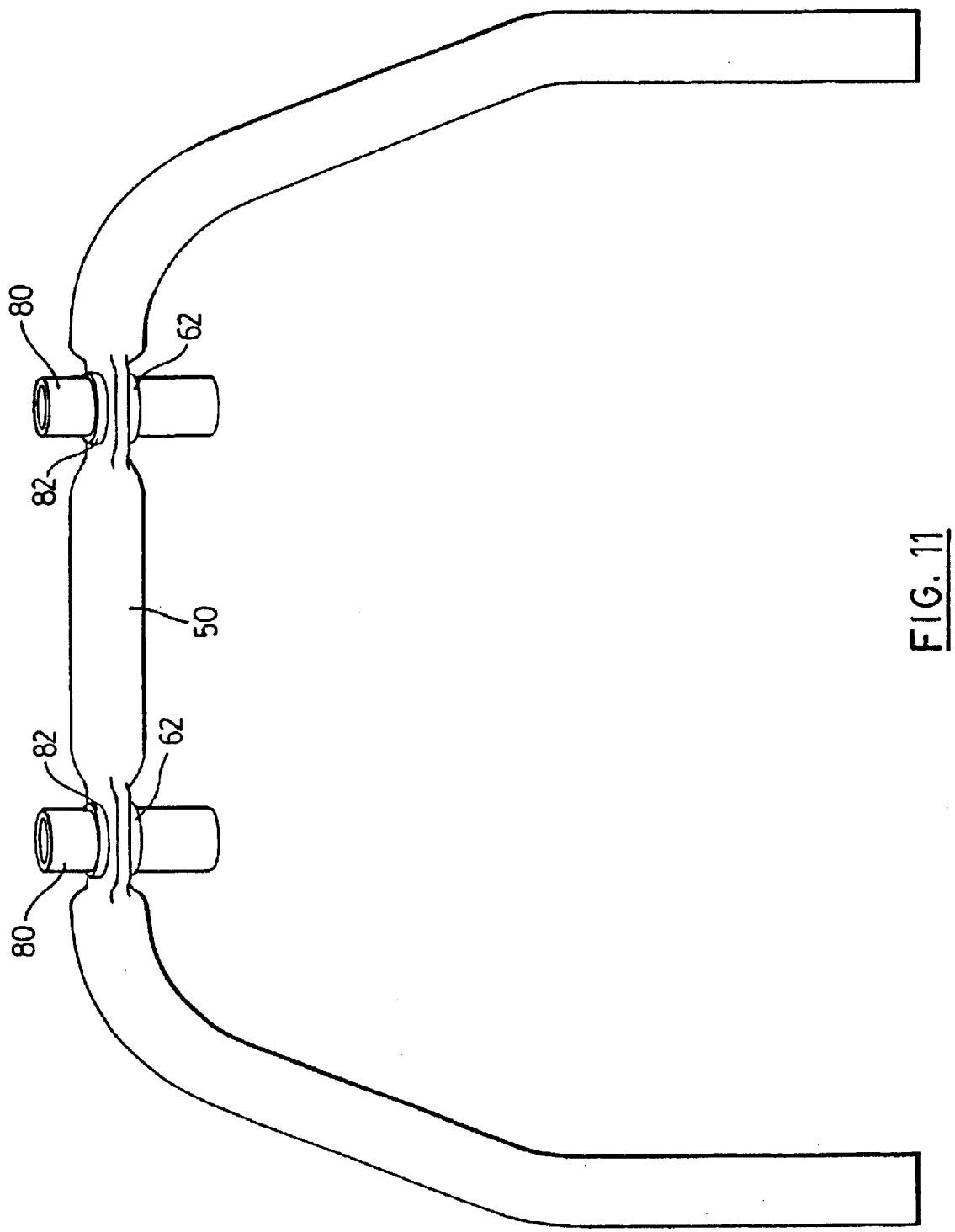
FIG. 11 is a perspective view of a pair of headrest guide tubes secured to a tubular seat frame member.
Figure 12:
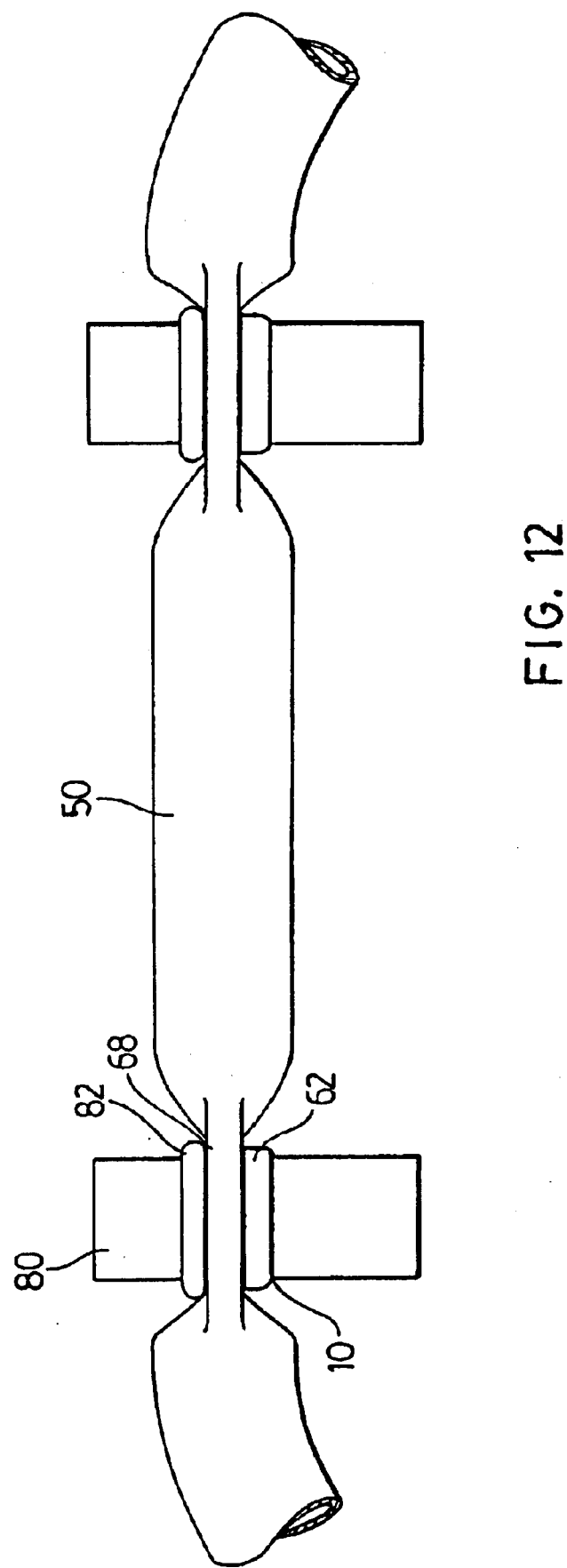
FIG. 12 is a front elevation of two headrest guide tubes secured to a section of seat frame tubing.
Figure 13:
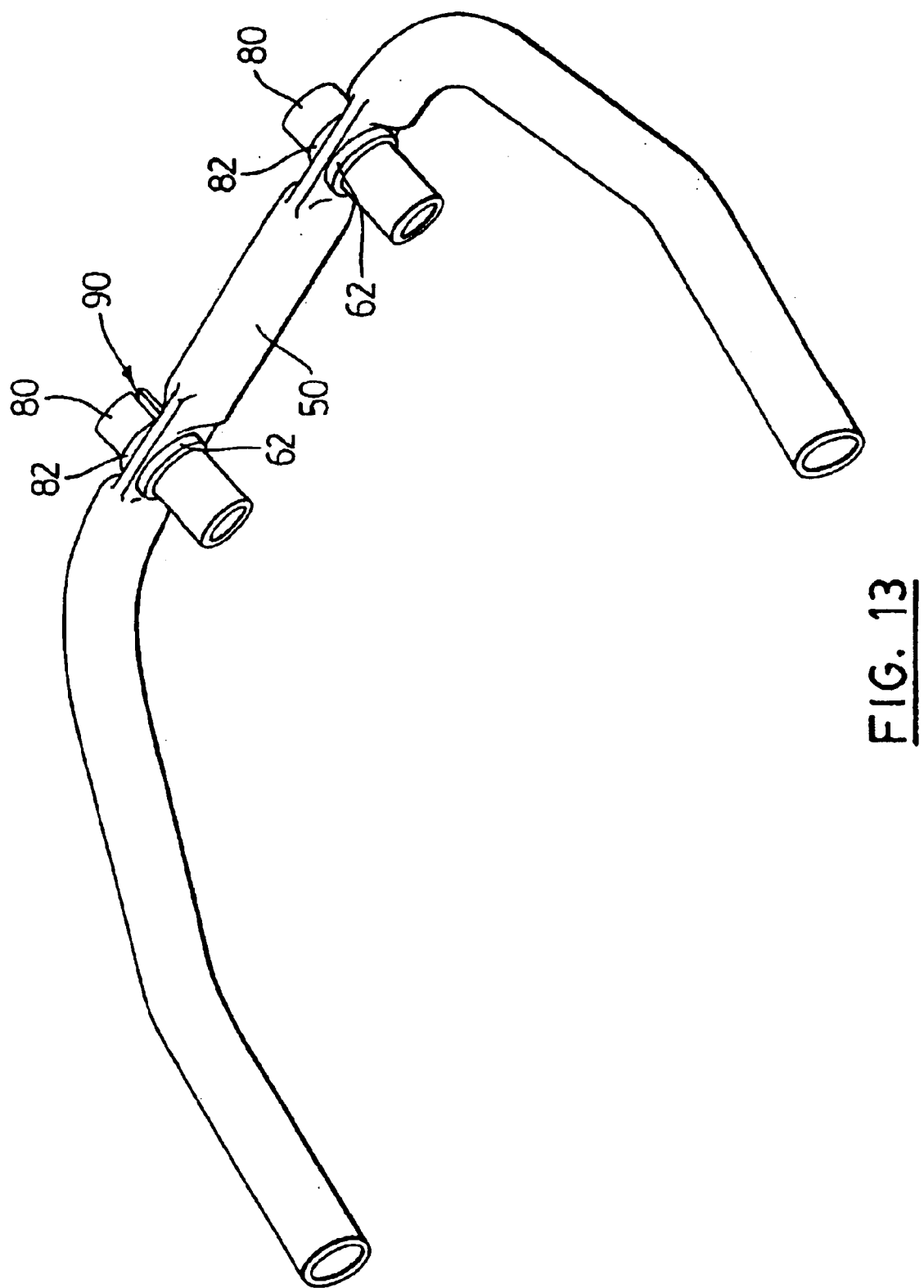
FIG. 13 is a perspective view corresponding to FIG. 10 but illustrating a longer run of tubing; and, FIG. 14 is an end elevation of a headrest guide tube inserted through a tubular seat frame.
Figure 14:
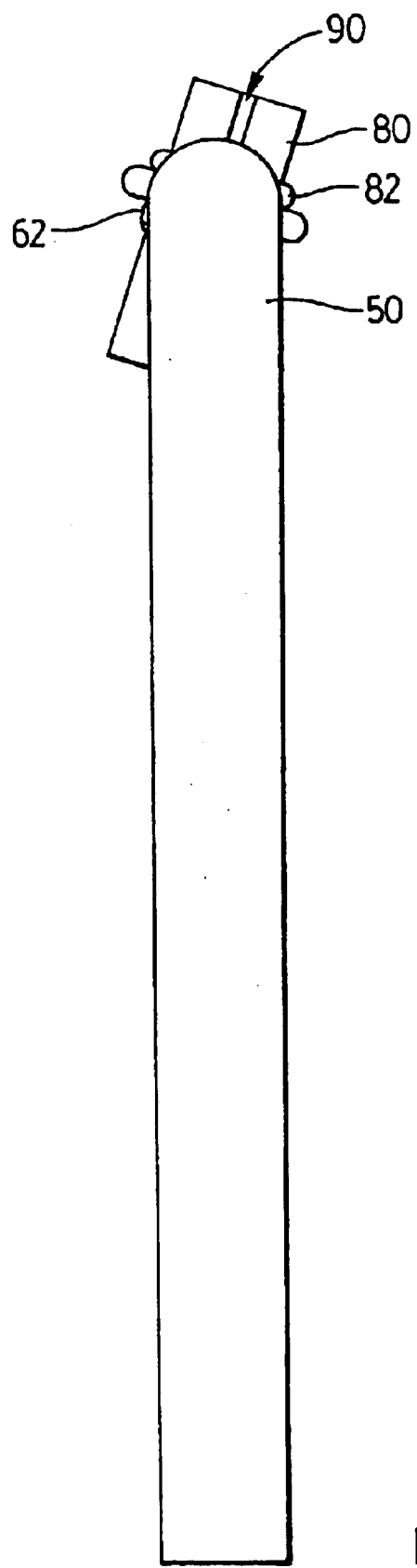

FIGS. 5 through 8 illustrate the mounting of a headrest guide tube 80 to the tubing 50 which may be a tubular seat frame member. As illustrated in FIG. 5, the guide tube 80 may be inserted into the passage 60 as a "blank" tube (i.e. having generally straight sides free of projections). The guide tube 80 is placed over a mandrel 300 which extends through a second forming member 310. The mandrel 300 has a shoulder 302 which extends radially outwardly to limit the distance the guide tube 80 may be slid therealong. The mandrel 300 resists inward collapse of the guide tube 80 during forming and thereby maintains alignment and a minimum diameter of the inside of the guide tube 80.

The second forming member 310 is configured to closely receive the guide tube 80 and the wall 62 about the passage 60 through the tubing 50. In a first position illustrated in FIGS. 5 and 6, the mandrel 300 is positioned relative to the second forming member 310 to abut against the tubing 50 about the wall 62 and provide support thereabout.

A first forming member 320 is next lowered over the guide tube 80 and mandrel 300. The first forming member has a receptacle 322 for receiving the mandrel 300 and the guide tube 80. The receptacle 322 has a shoulder 324 for abutting against the end of the guide tube 80 and limiting its travel into the receptacle 322. Continued movement of the first forming member 320 toward the tubing 50 as supported by the second forming member 310 will cause deformation of the guide tube 80 in a radially outward direction in the space between the first forming member 320 and the tubing 50. As a result, a bead 82 forms adjacent the entrance 68 of the passage 60 through the tubing 50.

It will be appreciated that the bead 82 may be pre-formed on the guide tube 80 before insertion into the passage 60. It is however believed that forming the bead 82 while the guide tube 80 is in the passage 60 will cause better conformity between the profile of the bead 82 and the passage 60.

The bead 82 acts as a first detent on the guide tube to limit displacement of the guide tube in a first direction, namely into the entrance 68.

FIGS. 7 and 8 illustrate the final forming steps. As illustrated in FIG. 7, the first forming member 310 is moved away from the tubing 50 and the mandrel 300 is slid upwardly as illustrated relative to the first forming member 310 to extend further therefrom. This exposes a portion 84 of the guide tube 80.

The second forming member 310 and the mandrel 300 are next urged toward the first forming member 320 which is now supporting the bead 82. This causes some of the exposed portion 84 of the guide tube 80 to deform radially outwardly into the wall 62 of the passage 60 as shown at reference 86. The second forming member 310 restrains the wall 62 from expanding radially outwardly. This forming operation is referred to as "clenching" and is one manner in which a second detent may be formed to, in combination with the first detent (the bead 82) fixedly secure the guide tube 80 into the tubing 50 which comprises the tubular seat frame member.

Alternatively the second forming member 310 may be configured to form a second bead adjacent the exit 70 of the passage 60. This may be accomplished by transferring the guide tube 80 and tubing 50 assembly after the first beading operation to a further forming member similar to the first member 320 and forming a bead in much the same way as with the first bead 82.

FIGS. 9 through 14 illustrate finished assemblies with a headrest guide tube 80 mounted to a tubular seat frame member of metal tubing 50. A notch 90 is illustrated in some of the guide tubes 80 which would have to be correctly oriented to receive the detent means or to align the insert (not shown) associated with the headrest guide posts (not shown) to be inserted therein.

The above description is intended in an illustrative rather than a restrictive sense. Variations may be apparent to persons skilled in metal forming and such structures without departing from the spirit and scope of the invention which is defined by the claims set out below.

What is claimed is:

1. A tubular seat frame member comprising:

a run of ductile metal tubing having at least two headrest guide tube mounting passages formed therein and extending transversely therethrough;

each of said mounting passages having an upstanding wall encircling said mounting passage and extending outwardly from one side of said tubular seat frame member;

each said upstanding wall being formed from and integral with said run of ductile metal tubing;

each of said mounting passages having a first end proximal said run of tubing and a second end distal said run of tubing.

2. The tubular seat frame member of claim 1 wherein:

said upstanding wall further comprises nested inner and outer wall members extending from respectively opposite sides of said tubular seat frame member.

3. The tubular seat frame member of claim 2 further comprising:

a respective headrest guide tube extending through each of said mounting passages;

each said headrest guide tube being secured to said seat frame by a first locating means at said first end and a second locating means at said second end.

4. The tubular seat frame member of claim 3 wherein:

said first and second locating means are respective beads formed in said guide tube.

5. The tubular seat frame member of claim 3 wherein:

said first locating means is a bead formed in said headrest guide tube; and, said second locating means is a clenching of said upstanding wall about said headrest guide tube.

6. The tubular seat frame member of claim 4 or 5 wherein:

said headrest guide tube and said run of tubing having inter-engaging projections and recesses formed therein to restrain said guide tube from rotation relative to said run of tubing.

7. The tubular seat frame member of claim 1, 2, 4 or 5 wherein:

said run of tubing has a flattened region in the vicinity of said passage.

8. The tubular seat frame of claim 3 wherein:

said run of tubing has a flattened region in the vicinity of said passage.

9. The tubular seat frame of claim 6 wherein:

said run of tubing has a flattened region in the vicinity of said passage.

* * * * *

UNITED STATES PATENT AND TRADEMARK OFFICE
CERTIFICATE OF CORRECTION

PATENT NO. : 6,709,061 B2
DATED : March 23, 2004
INVENTOR(S) : McWhinnie et al.

It is certified that error appears in the above-identified patent and that said Letters Patent is hereby corrected as shown below:

<u>Title page,</u>
Item [30], Foreign Application Priority Data, please add:
-- Feb. 6, 2002     (CA)........................2,370,811 --.

Signed and Sealed this

Twenty-fourth Day of August, 2004

JON W. DUDAS
*Director of the United States Patent and Trademark Office*